(12) United States Patent
Holland, Jr.

(10) Patent No.: US 9,161,496 B2
(45) Date of Patent: Oct. 20, 2015

(54) MOISTURE CONTROL GRID

(71) Applicant: Wayne Holland, Jr., Simi Valley, CA (US)

(72) Inventor: Wayne Holland, Jr., Simi Valley, CA (US)

(*) Notice: Subject to any disclaimer, the term of this patent is extended or adjusted under 35 U.S.C. 154(b) by 0 days.

(21) Appl. No.: 13/734,787

(22) Filed: Jan. 4, 2013

(65) Prior Publication Data

US 2014/0193200 A1 Jul. 10, 2014

(51) Int. Cl.
*A01G 25/00* (2006.01)
*A01G 1/00* (2006.01)
*E02B 11/00* (2006.01)

(52) U.S. Cl.
CPC ............... *A01G 1/005* (2013.01); *A01G 1/002* (2013.01); *A01G 25/00* (2013.01); *E02B 11/00* (2013.01)

(58) Field of Classification Search
CPC ....... A01G 1/002; A01G 1/005; A01G 25/06; A01G 27/00; E02B 11/00; E02B 13/00; E02D 31/02; E02D 3/10; E02D 2300/0085
USPC ........... 405/36, 38, 39, 43, 46, 47, 50, 52, 53, 405/109; 47/48.5, 79, 80, 65.5, 65.9, 66.5, 47/86; 210/170.03, 170.07; 52/169.5, 52/169.6
See application file for complete search history.

(56) References Cited

U.S. PATENT DOCUMENTS

| | | | |
|---|---|---|---|
| 4,528,774 A | 7/1985 | Skaife | |
| 4,572,700 A | 2/1986 | Mantarro et al. | |
| 4,662,778 A | 5/1987 | Dempsey | |
| 5,062,239 A | 11/1991 | Helton | |
| 5,330,828 A | 7/1994 | Jacobsen, Jr. et al. | |
| 5,401,118 A | 3/1995 | Kramer | |
| 5,460,867 A * | 10/1995 | Magnuson et al. | 428/178 |
| 5,484,501 A | 1/1996 | Jacobsen, Jr. et al. | |
| 5,567,077 A * | 10/1996 | Yang | 405/45 |
| 5,601,236 A | 2/1997 | Wold | |
| 5,662,983 A * | 9/1997 | Stark | 428/117 |
| 5,823,711 A | 10/1998 | Herrd et al. | |

(Continued)

FOREIGN PATENT DOCUMENTS

| | | | |
|---|---|---|---|
| GB | 2053640 | * | 2/1981 |
| WO | WO 2012/051430 | * | 4/2012 |

OTHER PUBLICATIONS

International Search Report and Written Opinion dated Mar. 27, 2014 for International Application No. PCT/US2013/072837, 9 pages.

*Primary Examiner* — Benjamin Fiorello
*Assistant Examiner* — Carib Oquendo
(74) *Attorney, Agent, or Firm* — Christie, Parker & Hale, LLP (57) ABSTRACT

A moisture collection apparatus is provided to collect and store percolating ground water for increased water absorption by foliage growing above the moisture collection apparatus. In one embodiment, the moisture collection apparatus includes a first plurality of strands extending along a first direction, a second plurality of strands extending along a second direction and connected to at least one of the first plurality of strands, a plurality of channels extending along at least one of the first direction and the second direction, and a plurality of openings between adjacent strands of the first plurality of strands and adjacent strands of the second plurality of strands. In another embodiment, the first direction is substantially orthogonal to the second direction, such that the moisture collection apparatus forms a grid-like pattern of channels.

24 Claims, 8 Drawing Sheets

(56) References Cited

U.S. PATENT DOCUMENTS

| | | | | |
|---|---|---|---|---|
| 5,829,192 A | | 11/1998 | Gatliff | |
| 5,848,856 A | * | 12/1998 | Bohnhoff | 405/36 |
| 5,938,372 A | | 8/1999 | Lichfield | |
| 6,095,718 A | | 8/2000 | Bohnhoff | |
| 6,428,870 B1 | | 8/2002 | Bohnhoff | |
| 6,539,681 B1 | * | 4/2003 | Siegmund | 52/403.1 |
| 6,691,472 B2 | * | 2/2004 | Hubert | 52/169.5 |
| 6,726,402 B1 | * | 4/2004 | Martinez | 405/40 |
| 6,779,946 B1 | | 8/2004 | Urriola et al. | |
| 6,877,932 B2 | * | 4/2005 | Prevost | 405/38 |
| 7,108,454 B2 | | 9/2006 | Blackwood | |
| 7,201,538 B2 | | 4/2007 | Blackwood | |
| 7,272,911 B2 | | 9/2007 | Gatliff | |
| 7,290,958 B2 | | 11/2007 | Blackwood | |
| 7,341,401 B2 | | 3/2008 | Blackwood | |
| 7,503,726 B2 | | 3/2009 | Blackwood | |
| 7,578,635 B2 | | 8/2009 | Blackwood | |
| 7,682,105 B2 | | 3/2010 | Ayers et al. | |
| 7,815,395 B1 | | 10/2010 | Blackwood | |
| 7,938,597 B2 | | 5/2011 | Blackwood | |
| 8,371,066 B2 | * | 2/2013 | Mathy | 47/66.5 |
| 2003/0082359 A1 | * | 5/2003 | Scott | 428/221 |
| 2007/0130828 A1 | * | 6/2007 | Mathy | 47/65.9 |
| 2007/0189852 A1 | * | 8/2007 | Wolfley | 405/36 |
| 2010/0092240 A1 | | 4/2010 | Glasser | |
| 2013/0298462 A1 | * | 11/2013 | Moran | 47/66.7 |

* cited by examiner

MOISTURE CONTROL GRID

TECHNICAL FIELD

This application relates generally to a device for collecting moisture, and more particularly to a device for collecting and storing water for plant absorption.

BACKGROUND OF THE INVENTION

In general, plants are able to absorb only a portion of the water available to the plant through either rainfall or watering. The remainder of the water not initially absorbed by the plant is lost either through evaporation or percolation down through the soil. Conventional water collection apparatuses used in gardens generally consist of a semi-permeable or impermeable membrane, such as a thin plastic liner, spread across the soil in order to prevent the excess water from being lost due to percolation down through the soil. The plastic liner is generally buried several inches below ground level, and then covered with a layer of soil before planting the foliage in the soil. Thus, with conventional water collection apparatuses, the plants are permitted to grow above the plastic liner while the liner collects water near or below the roots of the plants. However, these conventional moisture collection devices are generally not resilient, and are thus vulnerable to tearing due to user handling or root growth penetration. Additionally, conventional apparatuses generally are not configured to permit the growth of roots through the apparatus and they inhibit the migration of insects which may be beneficial to the growth of the plants. Moreover, conventional moisture control devices, particularly non-porous liners, may provide inadequate drainage which can be harmful to the foliage growing above the device.

As such, there is a need for a water collection apparatus configured to collect and store water for plant absorption while still permitting the roots to grow below the apparatus and providing adequate drainage of excess water. Additionally, there is a need for a moisture collection apparatus that is both durable and easy to install across a cultivation region.

SUMMARY OF THE INVENTION

The present invention is directed to a moisture collection grid configured to collect and store percolating ground water to increase water absorption by foliage growing above the apparatus. In one embodiment of the present invention, the moisture collection grid includes a first plurality of strands extending along a first direction, a second plurality of strands extending along a second direction and connected to at least one of the first plurality of strands, a plurality of channels extending along at least a portion of one of the first direction and the second direction, and a plurality of openings between adjacent strands of the first plurality of strands and adjacent strands of the second plurality of strands. In one embodiment, the channels are hemispherical dimples. In a further embodiment, the first direction is substantially orthogonal to the second direction such that the apparatus forms a grid-like structure. In one embodiment, one of the first and second directions is circumferential such that one of the first and second plurality of strands is generally circular. In another embodiment, one of the first plurality of strands extends beyond a first and last one of the second plurality of strands. In yet a further embodiment, the channels are U-shaped and include an arcuate surface having two upper edges, and two substantially vertical wall portions extending in a first direction from the two upper edges. In yet another embodiment, the channels are substantially rectangular. In a more detailed embodiment, the moisture control grid includes at least one flange extending outward from each of the plurality of channels. In a further embodiment, the moisture control grid includes a plurality of troughs formed at each of the interconnections between the first plurality of strands and the second plurality of strands.

According to an aspect of embodiments of the present invention, the moisture collection grid is configured to be installed below a predetermined depth of soil. In one embodiment, the moisture collection grid is configured to be installed approximately 6 inches below ground. Additionally, the moisture control grid is configured to be relocated to a greater or lesser depth in the soil if the user determines that the foliage and soil are suffering from either water saturation or water deprivation.

Additional aspects and/or advantages of embodiments of the present invention are set forth in the following description and accompanying drawings, or may be obvious in view thereof to those skilled in the art.

BRIEF DESCRIPTION OF THE DRAWINGS

These and other features and advantages of the present invention will be better understood by reference to the following detailed description when considered in conjunction with the accompanying drawings, wherein.

DETAILED DESCRIPTION

The present invention relates generally to moisture control devices, and more particularly to a moisture control grid 10 configured to permit greater water absorption by plants. In general, the moisture control grid 10 of the present invention is configured to be buried at a predetermined depth in the soil below plants, such as grass or vegetables, growing above the apparatus. The moisture control grid 10 is configured to collect water near the roots of the plants growing above the device. At least a portion of the water that is not initially absorbed by the plant as the water percolates through the soil is collected in the moisture control grid 10, where the water is stored until it is absorbed by the roots. Additionally, the moisture control grid 10 is configured to permit the plant roots to extend below the device and thereby extract additional nutrients from the soil below the device. The moisture control grid 10 is also adapted to allow adequate drainage of excess water through the device, and to provide a pathway for insects to migrate between the plants and the soil below the device. Moreover, the moisture control grid 10 is also configured for durability and rapid installation.

In an embodiment of the present invention shown in FIG. 1, the moisture control grid 10 is shown buried at a predetermined depth 11 below surface soil 12 and foliage 13 growing therein. Roots 15 are shown extending down into the soil 12. In one embodiment, the moisture control grid 10 is preferably buried at a depth 11 between about 2 and 10 inches below ground, and more preferably about 6 inches below ground. However, the moisture control grid 10 may be buried at a greater or lesser depth 11 depending upon factors such as the type of foliage 13 growing above the moisture control grid 10, the environmental conditions in which the moisture control grid 10 is used, such as average annual rainfall and average temperature of the region, the user's desired frequency of watering the foliage 13, and the composition of the soil 12. In general, there is an inverse relationship between the density of the soil 12 and the appropriate depth 11 at which the moisture control grid 10 should be installed in the soil 12. Denser soil 12 compositions, such as clay, are generally less porous than sand or silt soil compositions. In general, neither percolating water nor the roots 15 of the foliage 13 can penetrate as deep into such denser soil 12 compositions. Accordingly, the moisture control grid 10 should preferably be installed closer to the surface when the soil 12 consists of a dense, relatively non-porous composition so that the moisture control grid 10 is located proximally to the depth at which the roots 15 are able to extend, and the water is able to percolate, into the dense soil 12.

Figure 1:
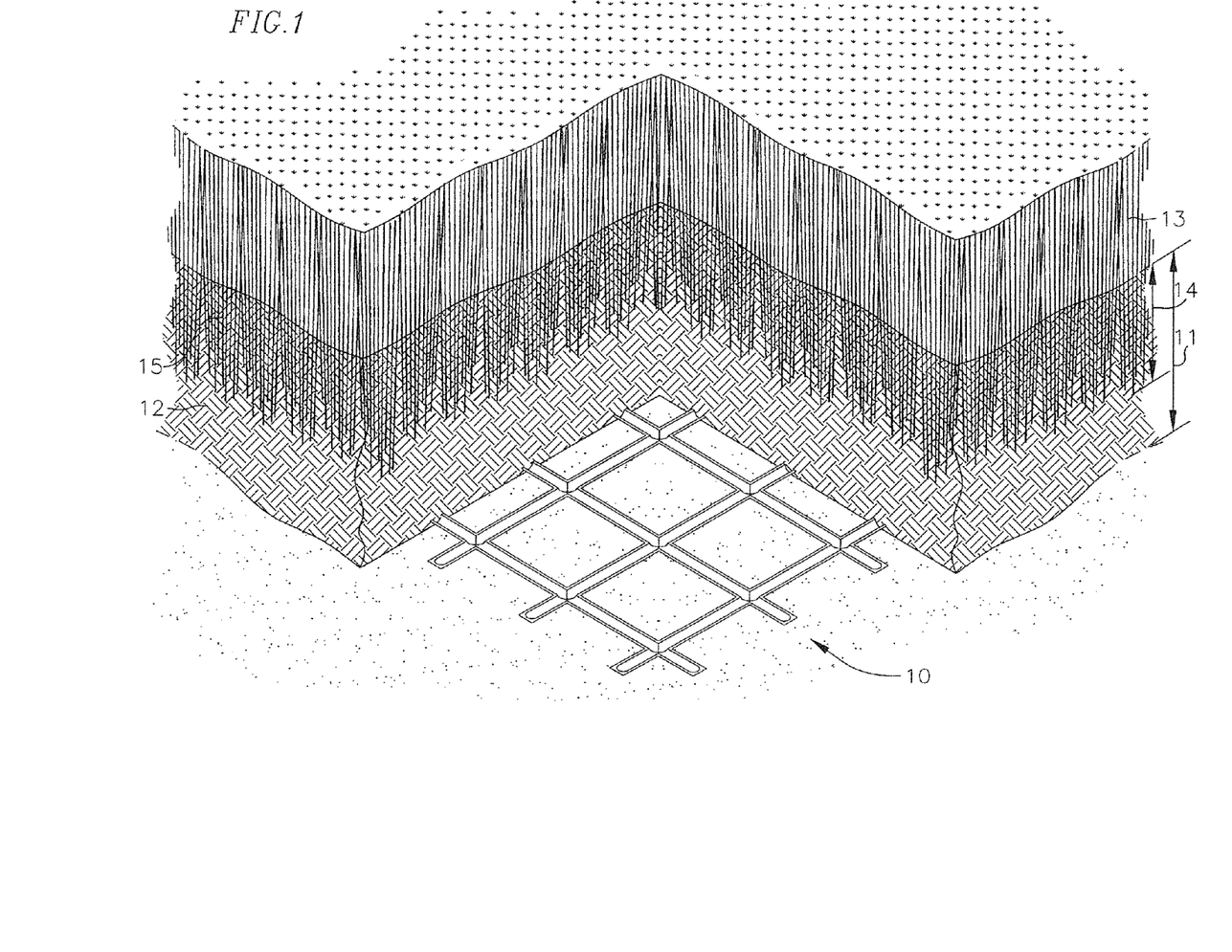
FIG. 1 is a breakaway perspective view of an embodiment of the moisture control grid shown buried below a layer of soil.

With continued reference to FIG. 1, the appropriate depth 11 at which the moisture control grid 10 should be installed also depends upon the natural root length 14 of the foliage 13 growing above the moisture control grid 10. In general, the moisture control grid 10 should be installed at a depth 11 such that the moisture control grid 10 is located proximally to the roots of the foliage 13 growing above the moisture control grid 10. Accordingly, the moisture control grid 10 should generally be installed at a greater depth 11 for foliage 13 with longer roots 15. Moreover, the appropriate depth 11 at which the moisture control grid 10 is to be installed also depends upon the configuration of the moisture control grid 10 and its water collection and storage capacity. The water collection and storage capacity of the moisture control grid 10 depends on factors such as the spacing between adjacent strands and the width and depth of the collection channels, as described in detail below. Although the moisture control grid 10 has been described with reference to installing the device at a predetermined depth 11, the moisture control grid 10 is also configured to be relocated if the user determines that the foliage 13 growing above the moisture control grid 10 is suffering from either water saturation or deprivation. For instance, if the user observes that the foliage 13 growing above the moisture control grid 10 is suffering from apparent water deprivation, the user may relocate the moisture control grid 10 to a lesser depth 11 in the soil, which is intended to facilitate increased water absorption by the foliage 13. Alternately, the user may replace the moisture collection grid 10 with a replacement moisture collection grid 10 having a greater water collection and storage capacity than the moisture collection grid 10 previously installed.

Figure 5:
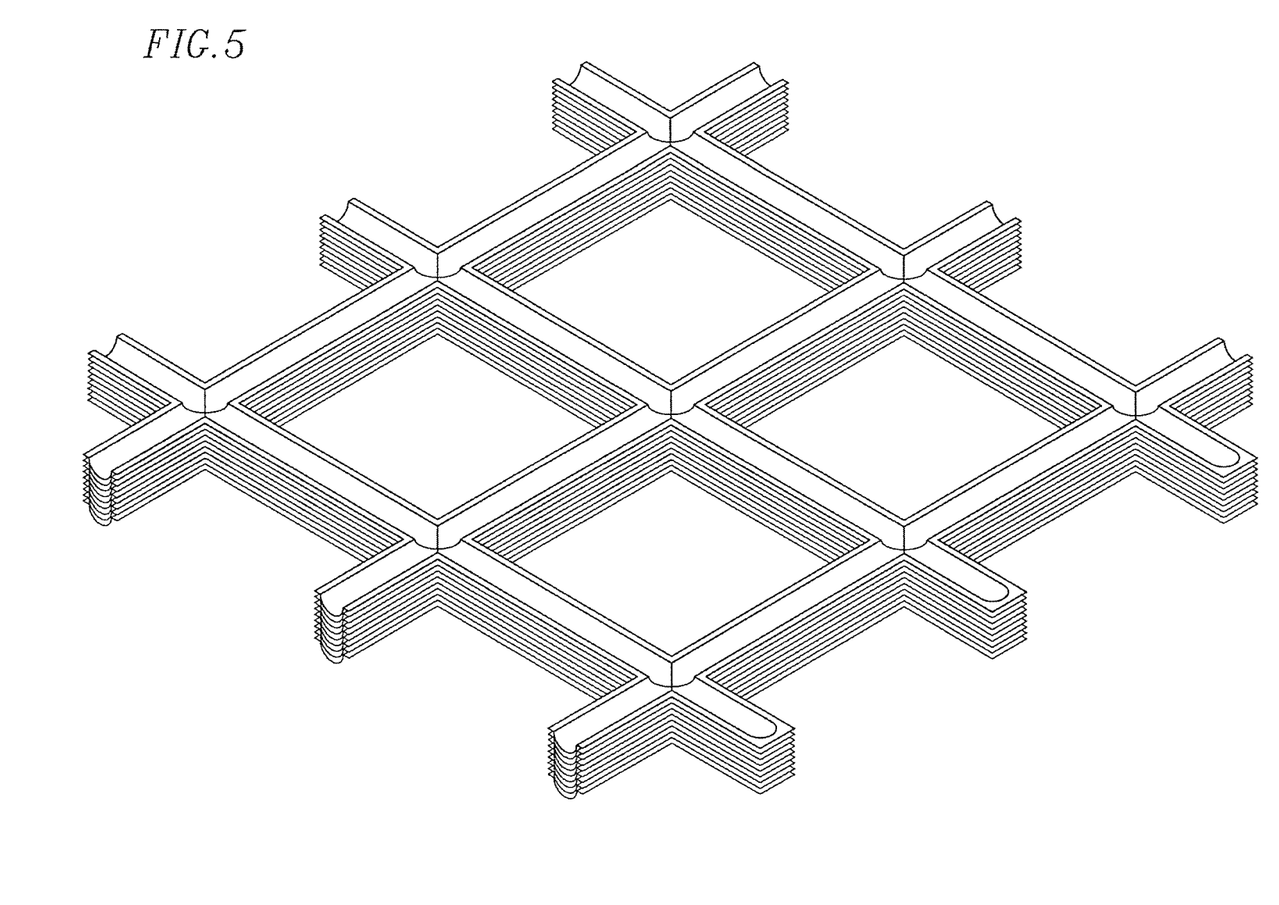
FIG. 5 is a perspective view of embodiments of the moisture control grid arranged in a stacked configuration.
Figure 6:
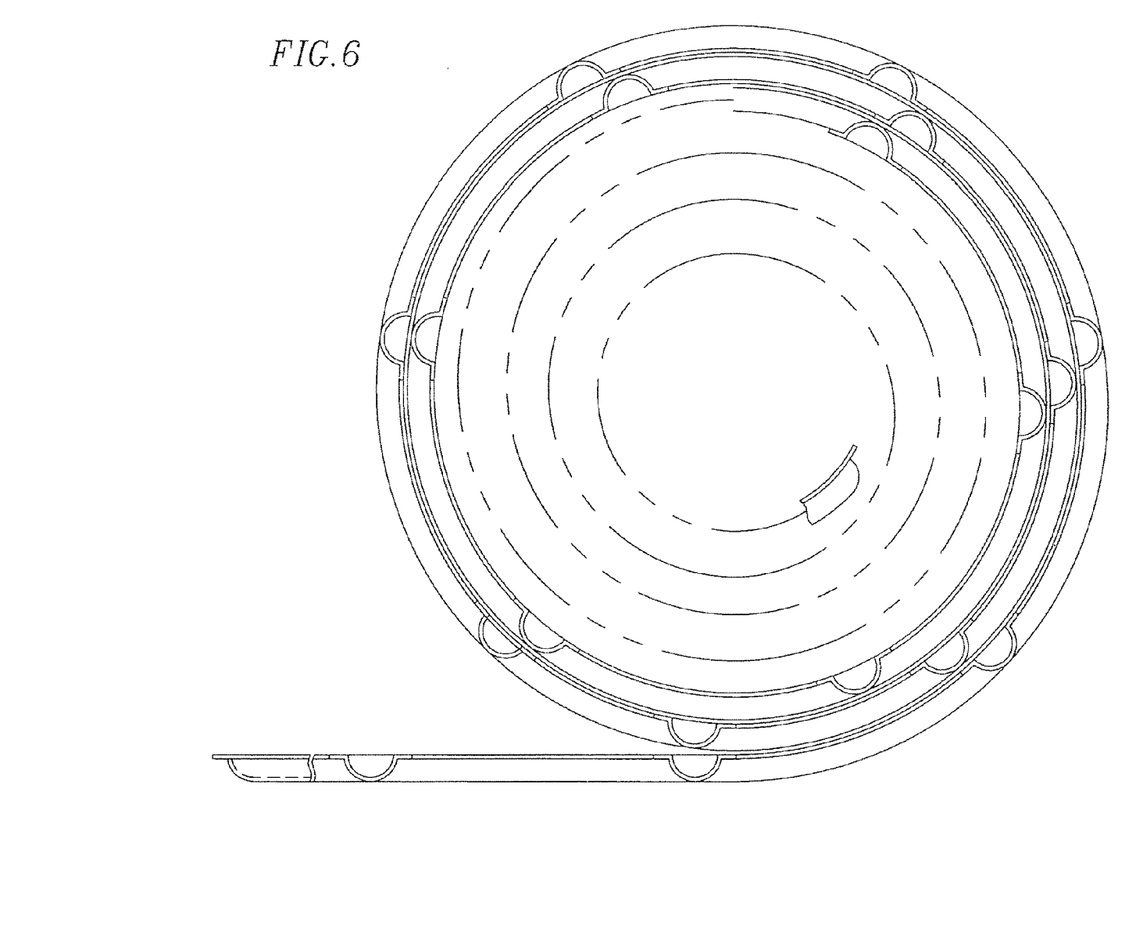
FIG. 6 is a perspective view of an embodiment of the moisture control grid in a rolled configuration.

The moisture control grid 10 may be provided in either relatively smaller pre-fabricated segments, as shown in FIG. 1, or provided as a relatively wider and longer roll which must be unfurled by the user and then cut to fit the terrain, as shown in FIG. 6. In one embodiment, the moisture control grid 10 is provided in a pre-fabricated 24-inch by 24-inch segment. In another embodiment, the moisture control grid 10 is provided in a pre-fabricated 14-inch by 14-inch segment. However, it will be appreciated that the prefabricated segments could have other dimensions and still be within the scope and spirit of the present invention. In the embodiments in which the moisture control grid 10 is provided in pre-fabricated segments, the moisture control grid 10 is configured to be stacked in a nested configuration, as shown in FIG. 5. Stacking the moisture control grid 10 segments in a nested configuration advantageously facilitates shipping and storing the moisture control grid 10 segments on a pallet, for instance.

Figures 2A, 2B:
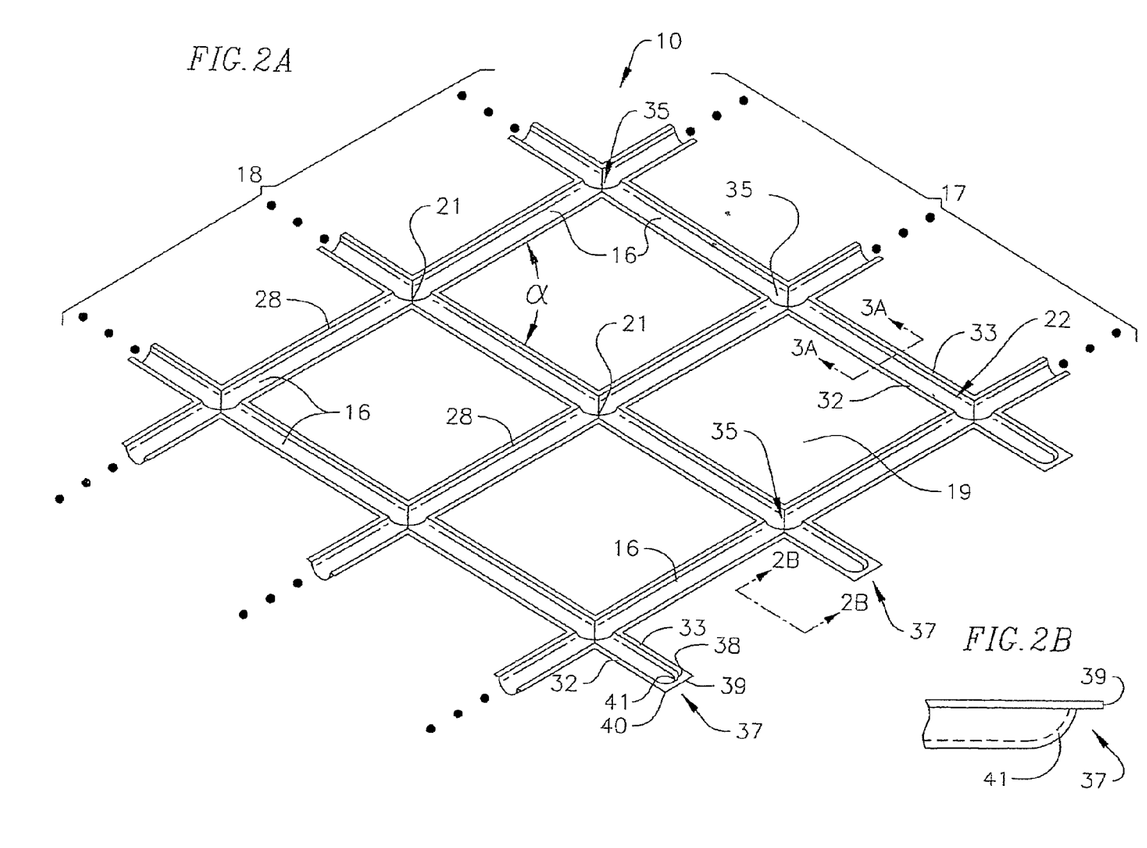
FIG. 2A is a perspective view of an embodiment of the moisture control grid.
FIG. 2B is a side view of an enclosed end of the embodiment shown in FIG. 2A.
Figure 7:
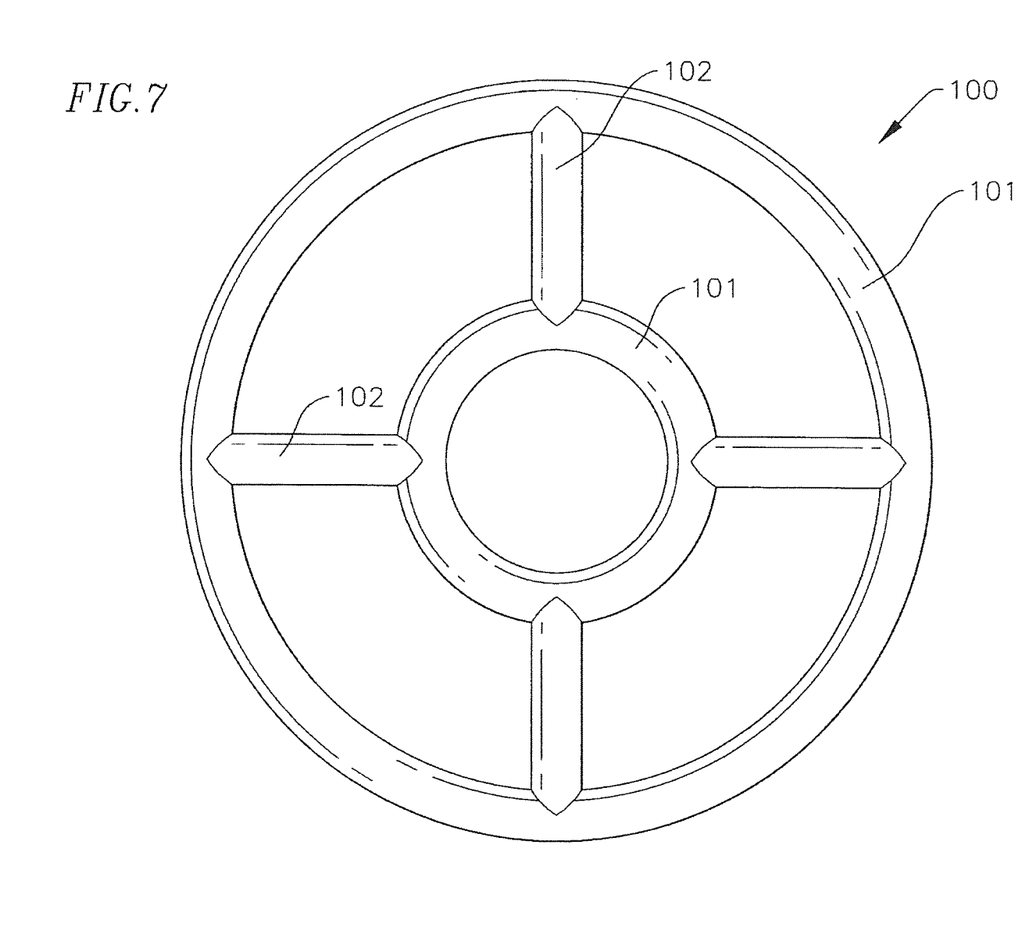
FIG. 7 is a top view of an embodiment of the moisture control grid having circular and radial strands.

Referring now to the embodiment of the present invention shown in FIG. 2A, the moisture control grid 10 is comprised of a plurality of interconnected strands 16. In the embodiment depicted in FIG. 2A, the strands 16 are oriented in a grid-like pattern of transverse strands 17 and longitudinal strands 18. An angle α is formed between the transverse strands 17 and the longitudinal strands 18. The angle α formed between the transverse strands 17 and the longitudinal strands 18 may be between approximately 60° and 120°, preferably between about 80° and 100°, and more preferably about 90°. It will be appreciated, however, that the invention described herein is not limited to the angles α described above, and any suitable angle α may be formed between the transverse strands 17 and the longitudinal strands 18 in order to achieve the desired characteristics of the moisture collection grid 10, such as water collection and storage capacity, structural rigidity, and drainage capacity. For instance, in one embodiment the angle α may be approximately 45° such that transverse and longitudinal strands 17, 18 form a diamond-shaped pattern. Furthermore, although the strands 18 have been described as generally straight segments, the strands 18 may alternately be curvilinear (e.g., round or S-shaped) or irregularly shaped. For instance, in the embodiment illustrated in FIG. 7, the moisture control grid 100 is comprised of a plurality of concentric circular strands 101 and a plurality of radial strands 102 connecting the circular strands 101 (i.e., the moisture control grid 100 is comprised of a plurality of circular strands 101 extending in a circumferential direction and a plurality of strands 102 extending in a radial direction between the circular stands 101). A moisture control grid 100 having circular strands 101 may be desirable for use in circular pots or planters, although the moisture control grid 100 is not limited to such uses.

With continued reference to the embodiment illustrated in FIG. 2A, the spacing between adjacent strands 16 is uniform across the moisture control grid 10 (i.e., each of the strands 16 are substantially equidistant from adjacent strands 16). In the illustrated embodiment, adjacent transverse strands 17 and adjacent longitudinal strands 18 are spaced apart by approximately 4 inches, respectively. However, the separation between adjacent strands 16 may be reduced or increased to accommodate different conditions. For instance, in a climate with relatively high rainfall, the spacing between adjacent strands 16 may be increased (e.g., approximately 6 to 10 inches between adjacent strands 16) to provide adequate drainage of excess water. Additionally, the separation between the strands 16 may be non-uniform across the moisture control grid 10 and still fall within the spirit and scope of the present invention. A moisture control grid 10 having non-uniformly spaced strands 16 can advantageously support the various water supply needs of diverse foliage 13 growing above the moisture control grid 10. For instance, plants with higher water absorption rates may be grown above a portion of the moisture collection grid 10 having adjacent strands 16 spaced relatively closer together, whereas plants with lower water absorption rates may be grown above a portion of the moisture collection grid 10 having adjacent strands 16 spaced relatively farther apart. Alternately, the user may install several moisture control grid 10 segments having different configurations to achieve a similar result.

Figure 4:
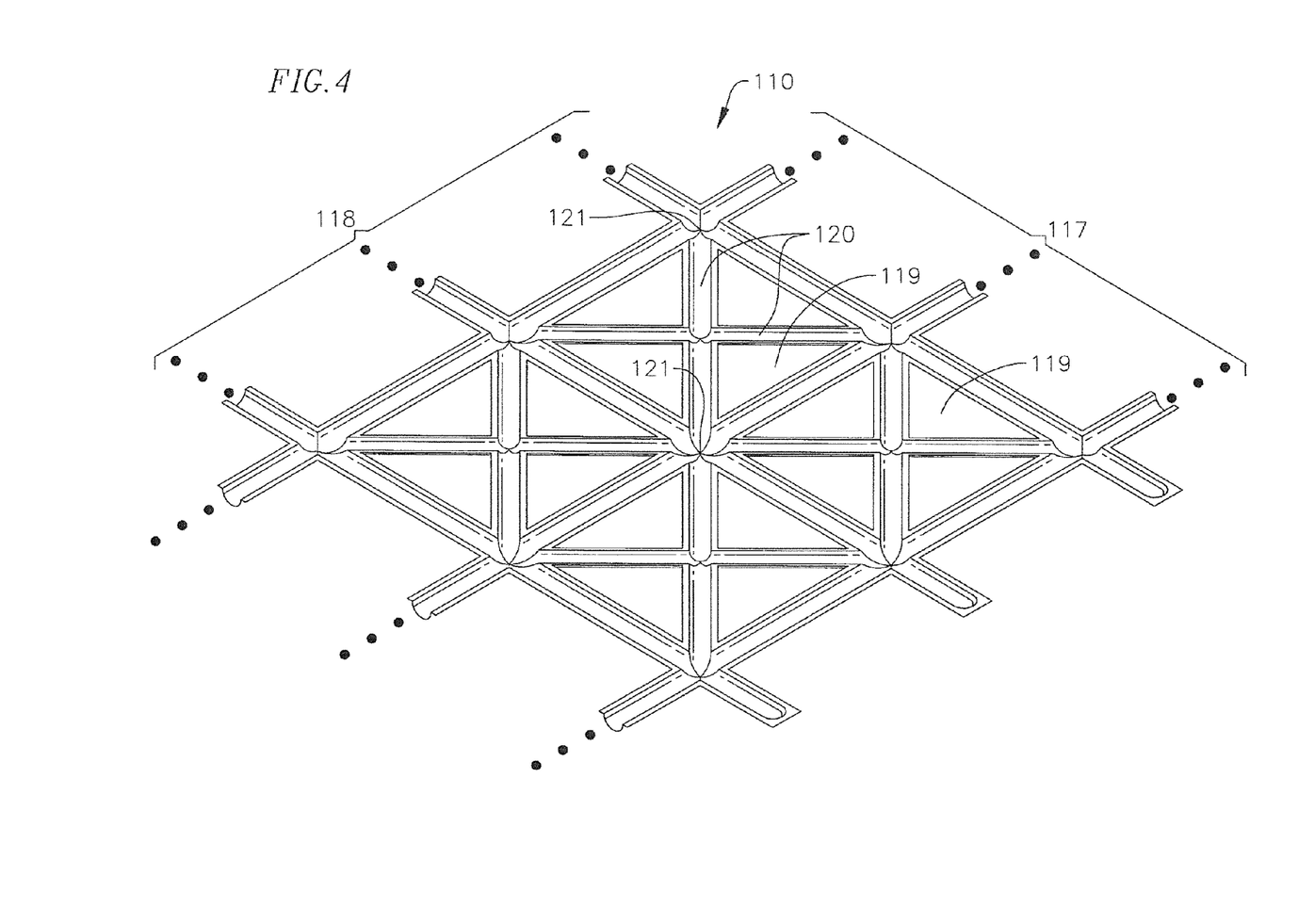
FIG. 4 is a perspective view of an embodiment of the moisture control grid having diagonal strands.

As shown in the embodiment illustrated in FIG. 2A, substantially square openings 19 are formed between adjacent strands 16. The square openings 19 shown in the embodiment of FIG. 2A are delineated by two adjacent transverse strands 17 and two adjacent longitudinal strands 18. The openings 19 formed between the strands 16 are advantageously configured to permit adequate drainage of excess water through the moisture collection grid 10, and to provide a pathway for insects to migrate between the foliage 13 and the soil located underneath the moisture collection grid 10. The openings 19 are also configured to permit the roots 15 of the foliage 13 (FIG. 1) to extend below the moisture control grid 10 and thereby extract additional nutrients from the soil 12 below the moisture control grid 10. Although the moisture control grid 10 has been described with reference to rectangular openings 19, the openings 19 may be formed in any other suitable shape, such as triangular or rectangular, in order to provide added structural integrity and/or additional water collection and storage capacity. For instance, in the alternate embodiment illustrated in FIG. 4, a moisture collection grid 110 may include diagonal strands 120 extending between interconnected portions 121 of transverse strands 117 and longitudinal strands 118. Accordingly, triangular openings 119 are formed between two interconnected diagonal strands 120 and the transverse and longitudinal strands 117, 118, respectively, in the alternate embodiment shown in FIG. 4.

With continued reference to the embodiment illustrated in FIG. 2A, the moisture control grid 10 includes channel portions 22 extending along the lengthwise direction of the transverse and longitudinal strands 17, 18, respectively. The channel portions 22 are configured to collect and store water for absorption by the foliage 13 growing above the moisture control grid 10. As shown in the cross-section of FIG. 3A, the "U-shaped" channel portions 22 are comprised of a lower arcuate portion 25 and two substantially vertical wall portions 26, 27 extending upward from the lower arcuate portion 25. The lower arcuate portion 25 and the two substantially vertical portions 26, 27 are generally formed from a relatively thin sheet having an interior surface and an exterior surface. The two vertical channels walls 26, 27 form a substantially rectangular opening 28 through which percolated water can enter and collect in the channel portions 22, as shown in FIG. 2A. When the moisture collection grid 10 is installed (FIG. 1), the rectangular openings 28 formed by the vertical channel walls 26, 27 are oriented upward such that water is configured to collect in the channel portions 22 as it percolates down through the soil 12. Although the channel portions 22 have been described with reference to a substantially U-shaped cross-section, other cross-sectional shapes are envisioned, for instance, V-shaped. In an alternate embodiment illustrated in FIG. 3B, the moisture collection grid includes channel portions 222 having a substantially rectangular cross-section for collecting and storing water percolating through the soil. In the alternate embodiment of FIG. 3B, the channel portions 222 include a substantially flat base portion 225 and two substantially vertical wall portions 226, 227 extending upward from opposite sides of the base portion 225 to form two sharp corners 228.

The cross-section of the channel portions 22 may also vary along the length of the strands 16. Moreover, it is envisioned that the channel portion 22 formed along one strand 16 may have a different configuration than the channel portion 22 formed along a different strand 16. Varying the configuration of the channel portions 22 along the length of the strands 16 or between different strands 16 may be advantageous, for instance, if the moisture control grid 10 is installed along an uneven surface. For example, if the moisture control grid 10 of the present invention is to be installed along a sloped surface, it may be advantageous for the channel portions 22 formed on an upper part of the slope to have a larger water storage capacity than the channel portions 22 formed on a relatively lower portion of the slope. On a sloped surface, water tends to collect or "pool" at the base of the slope, and therefore the foliage 13 growing on the upper portion of the slope may require more water supplementation than the foliage 13 nearer the lower portion of the slope. The configuration of the moisture collection grid 10 can compensate for this "pooling" effect by having transverse strands 17 near the upper portion of the slope with wider or deeper channel portions 22 than the channel portions 22 formed on the transverse strands 17 closer to the lower portion of the slope.

Figure 3A:
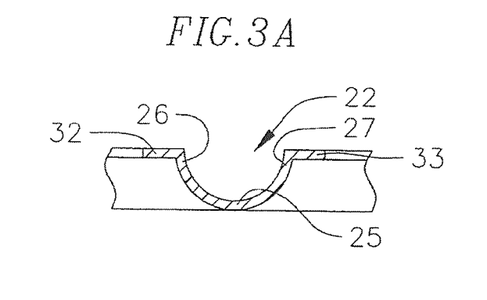
FIG. 3A is a cross-section of the embodiment of the moisture control grid in FIG. 2A.
Figure 3B:
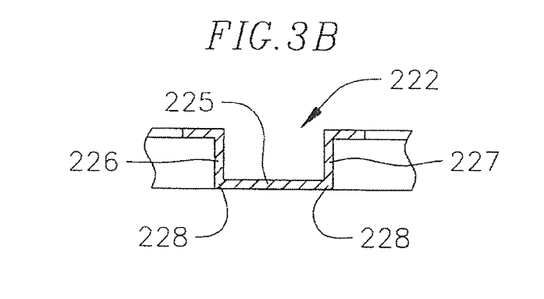
FIG. 3B is an alternate embodiment of the cross-section shown in FIG. 3A having a square shape.

With continued reference to the illustrated embodiment of FIGS. 2A and 3A, the strands 16 also include a pair of cantilevered flanges 32, 33 extending outward from upper edges of the vertical channel walls 26, 27, respectively (i.e., the cantilevered flanges 32, 33 are formed on opposite sides of the channel portions 22 and extend outward therefrom). The cantilevered flanges 32, 33 formed on the transverse and longitudinal strands 17, 18 extend outward in a direction transverse to the lengthwise direction of the transverse and longitudinal strands 17, 18, respectively. The cantilevered flanges 32, 33 are generally comprised of a wall formed from a relatively thin sheet having an upper surface and a lower surface. In the illustrated embodiment of FIG. 3A, the flanges 32, 33 extend orthogonally from the upper channel walls 26, 27 such that the cantilevered flanges 32, 33 are substantially co-planar. In an alternate embodiment depicted in FIG. 3C, the moisture control grid includes a U-shaped channel portion 322 having a lower arcuate portion 325 and two substantially vertical wall portions 326, 327 extending upward from the lower arcuate portion 325, substantially as described with reference to FIG. 3A above. The alternate embodiment of FIG. 3C, however, includes cantilevered flanges 332, 333 deflected upward such that an obtuse angle θ is formed between the flanges 332, 333 and the vertical channel walls 326, 327, respectively. The obtuse angle θ formed between the flanges 332, 333 and the vertical channel walls 326, 327, respectively, may be between approximately 150° and 100°, preferably between about 135° and 115°, and more preferably about 125°. Vertically deflected flanges 332, 333 advantageously promote greater water collection and storage in the moisture control grid by extending the effective width and depth of the channel portions 322.

With reference again to FIG. 2A, the flanges 32, 33 are also configured to protect the user during installation of the moisture collection grid 10 in the soil 12. Otherwise, the rectangular opening 28 formed by the relatively thin vertical channel walls 26, 27 may present a sharp edge upon which the user could inadvertently cut his/her hand while installing the moisture control grid 10. The flanges 32, 33 also advantageously provide added structural rigidity to resist the weight of the soil 12 which tends to deflect the strands 16. However, it will be appreciated that the upper portion of the vertical channel walls 26, 27 could have other configurations and still be within the scope and spirit of the present invention.

With continued reference to the embodiment illustrated in FIG. 2A, the vertical channel walls 26, 27 and the flanges 32, 33 are discontinuous at the interconnected portions 21 of the strands 16. In the illustrated embodiment, the lower arcuate portions 25 are continuous along the length of the strands 16 such the strands 16 are interconnected at the lower arcuate portions 25 of the channel portions 22. The discontinuous vertical channel walls 26, 27 and flanges 32, 33 form troughs 35 at the interconnected portions 21 of the strands 16. An upper portion of the troughs 35 forms a substantially square opening through which percolating ground water is permitted to enter and collect in the channel portions 22 and troughs 35. The troughs 35 act as fluid passageways which permit water collected in one channel portion 22 to flow into channel portions 22 formed along other strands 16. Water redistribution between the strands 16 is advantageous, for instance, when one portion of the moisture control grid 10 receives a disproportionate amount of water, such as when the user unevenly waters the foliage 13.

In an alternate embodiment, the interconnected portions 21 of the strands 16 may be configured to prevent the flow of water between the strands 16. For example, when the moisture control grid 10 is installed on a slope, as described above, it may be desirable to prevent the flow of water between the channel portions 22. Otherwise, water collected in strands 16 near the upper portion of the slope may flow down to the strands 16 near the lower portion of the slope and thereby deprive the foliage 13 growing on the upper portion of the slope of adequate water supply. Accordingly, in one embodiment, substantially vertical walls segments are formed at the interconnected portions 21 of the strands 16 to prevent water flow between the strands 16. In one embodiment, the vertical wall segments extend between the upper surface of the flanges 32, 33 and the lower arcuate portion 25 of the channel portions 22. The vertical wall segments are substantially aligned with the lengthwise direction of the transverse strands 17 such that water is prevented from flowing between the strands 16 when the longitudinal strands 18 are aligned along the sloping surface and the transverse strands 17 are aligned across the sloping surface. In an alternate embodiment, the vertical channel walls 26, 27 may be continuous along the entire length of the strands 16 to prevent water flowing between the channel portions 22 formed on different strands 16.

Figure 3C:
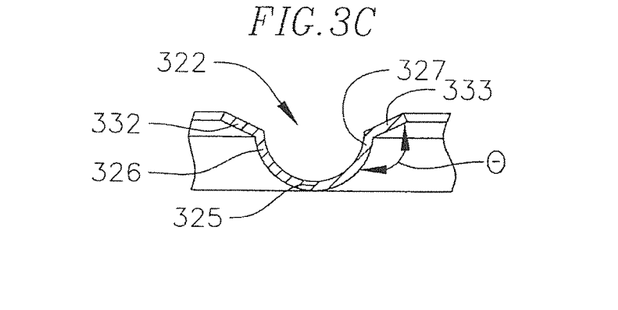
FIG. 3C is an alternate embodiment of the cross-section shown in FIG. 3A having deflected flanges.

Referring now to the embodiment illustrated in FIGS. 2A and 2B, the ends of the strands 16 are partially enclosed such that water collected in the channel portions 22 is not permitted to run freely off the ends of the strands 16. In the illustrated embodiment, the enclosed ends 37 are comprised of a hemispherical portion 41 extending between the lower arcuate portion 25 of the channel 22 and the upper surface of the flanges 32, 33. An upper portion of the hemispherical end portion 41 forms a semi-circular opening 38 through which percolating ground water is permitted to enter and collect in the channel portions 22. Additionally, as shown in FIGS. 2A and 2B, end flanges 39 extend outward from the upper portion of the hemispherical end portion 41. The end flanges 39 extend outward in a direction parallel to the lengthwise direction of the strands 16. The end flanges 39 are interconnected with the flanges 32, 33 to form a substantially right angle corner 40. In the illustrated embodiment, the end flanges 39 are substantially co-planar with the flanges 32, 33. In the alternate embodiment in which the flanges 332, 333 are deflected upward at an obtuse angle θ (FIG. 3C), the end flanges 39 are deflected upward at generally the same angle θ. In an alternate embodiment, the end flanges 39 may include rounded corner portions such that the width of the end flanges 39 are substantially equal to the width of the flanges 32, 33 (FIG. 3A) or 332, 333 (FIG. 3C). Although the enclosed ends have been described herein with reference to a hemispherical portion 41, the enclosed ends 37 may be formed from other shapes and still fall within the scope and spirit of the present invention. For instance, in the embodiment in which the channel portions 222 comprise a rectangular cross-section (FIG. 3B), the enclosed ends may be formed from a substantially vertical wall portion extending upward from the base portion 225 and between the vertical wall portions 226, 227. Although the enclosed ends 37 of the longitudinal strands 18 are shown and described extending beyond the outermost transverse strands 17, and the enclosed ends 37 of the transverse strands 17 are shown and described extending beyond the outermost longitudinal strands 18, in an alternate embodiment the moisture control grid 10 may not include enclosed ends 37 (i.e., in one embodiment, the moisture control grid 10 may not include cantilevered enclosed ends 37 extending beyond the transverse and longitudinal strands 17, 18, respectively). For instance, in one embodiment the transverse strands 17 may terminate at the outermost longitudinal strands 18, and the longitudinal strands 18 may terminate at the outermost transverse stands 17, such that the moisture control grid 10 does not include enclosed ends 37 extending beyond the strands 16. In this alternate embodiment, the moisture control grid 10 may include a continuous perimeter defined by the outermost transverse and longitudinal strands 17, 18.

With continued reference to the embodiment illustrated in FIG. 2A, the ratio between the planform area covered by the strands 16 and the planform area of the openings 19 formed between the strands 16 is between approximately 0.45 and 0.55. Accordingly, the embodiment of the moisture collection grid 10 illustrated in FIG. 2A is configured to collect and store up to approximately 31%-35% of the water percolating down through the soil 12 above the device. Additionally, the embodiment in which the moisture control grid 10 is provided in an approximately 14-inch by 14-inch segment, the channel portions 22 are configured to collect and store approximately 8 cubic inches of water. However, the area ratio between the strands 16 and the openings 19, and the water capacity of the moisture control grid 10, may vary based upon the configuration of the strands 16 and the shape and size of the channel portions 22, as described above. For example, in the alternate embodiment in which the moisture control grid 110 includes diagonal strands 120 extending between the interconnected portions 121 of the transverse and longitudinal strands 117, 118 (FIG. 4), the area ratio is between approximately 1.65 and 1.75 (i.e., the moisture collection grid 110 is configured to collect and store up to approximately 60%-62% of the water percolating down through the soil 12 above the device), and the water collection and storage capacity is approximately 15 cubic inches, for a 14-inch by 14-inch segment.

Figures 8A, 8B:
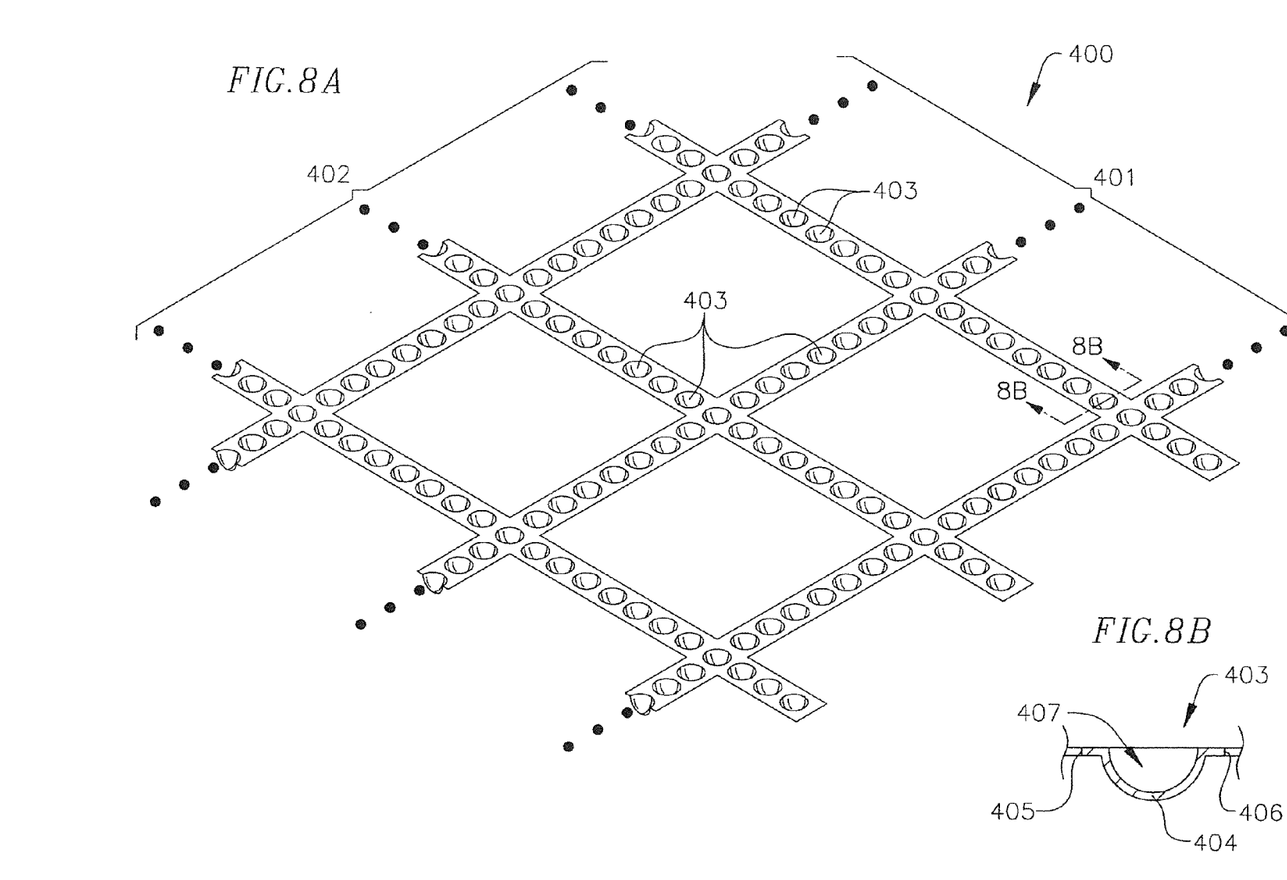
FIGS. 8A and 8B are a perspective view and a cross-sectional view, respectively, of an embodiment of the moisture control grid having dimples.

In an alternate embodiment illustrated in FIGS. 8A and 8B, a moisture control grid 400 comprises a plurality of interconnected transverse strands 401 and longitudinal strands 402. In the illustrated embodiment, both the transverse strands 401 and the longitudinal strands 402 include a plurality of dimples or depressions 403 disposed along the length of the strands 401, 402. The dimples 403 are configured to collect percolated water for reabsorption by the roots 15 of the foliage 13 (see FIG. 1). In one embodiment, the dimples 403 extend along the entire length of the strands 401, 402, although the dimples 403 may extend along only a portion of the strands 401, 402, depending upon the desired water capacity of the moisture control grid 400. In the illustrated embodiment, the dimples 403 include a lower arcuate portion 404 and flanges 405, 406 extending outward from opposite sides of the lower arcuate portion 404, substantially as described above with reference to FIGS. 3A-3C. Moreover, the lower arcuate portion 404 of each dimple 403 forms a cavity 407 for collecting water. Although the dimples 403 are illustrated as generally hemispherical, the dimples 403 may have any other suitable shape, such as cuboid, ovoid, or pyramidal, and still fall within the scope and spirit of the present invention.

The embodiments of the moisture control grid 10, 100, 110, 400 may be formed from any suitably durable and non-porous or semi-porous material, such as polyvinyl chloride (PVC), polychloroprene, copper, rubber, or carbon fiber reinforced plastic. The moisture control grid may also be formed from a biodegradable material, such as biodegradable plastic. The moisture control grid 10, 100, 110, 400 may be formed by any suitable process, such as liquid injection molding, stamping, welding, machining, vacuum forming, or rapid prototyping using additive manufacturing. In one embodiment, the strands may be individually formed and then interconnected according to any suitable process, such as welding, bonding, or fastening, to form the moisture collection grid 10, 100, 110, 400. In an alternate embodiment, the entire moisture collection grid 10, 100, 110, 400 may be formed as a unit, such as by molding, stamping, or vacuum forming. In the embodiment in which the moisture control grid 10, 100, 110, 400 is fabricated as a long sheet, the moisture control grid 10, 100, 110, 400 is preferably formed of a sufficiently elastic material to penult the moisture control grid 10, 100, 110, 400 to be wound up into a cylindrical spool for transportation and storage and then unwound during installation. Additionally, the configuration of the moisture control grid 10, 100, 110, 400 can be custom manufactured to accommodate the unique features of a particular terrain.

In use, the user selects a moisture control grid 10, 100, 110, 400 with a desired configuration to collect and store percolating ground water for increased water absorption by foliage 13. As described above, the configuration of the moisture control grid 10, 100, 110, 400 is determined by at least the spacing between adjacent strands 16, the shape and size of the channel portions 22 formed along the strands 16, the orientation of the strands 16, and the shape, size, and orientation of the flanges 32, 33. The user then installs the moisture control grid 10, 100, 110, 400 with the desired configuration at an appropriate depth 11 below the ground. The appropriate depth 11 at which to install the moisture control grid 10, 100, 110, 400 is determined by factors such as the climatic conditions of the environment in which the moisture control grid is to be used, the type of foliage 13 to be grown above moisture control grid, the user's desired frequency of watering the foliage 13, and the composition of the soil 12.

Preferably, the user then periodically monitors and/or measures the water retention in the soil 12 and the growth performance of the foliage 13 growing above the moisture control grid 10, 100, 110, 400 to determine if the soil 12 and foliage 13 are suffering from either water saturation or water deprivation. If the user determines that the soil 12 and foliage 13 are suffering from either water saturation or water deprivation, the user may reposition the moisture control grid 10, 100, 110, 400 and/or replace the moisture control grid 10, 100, 110, 400 having the selected configuration with a moisture control grid 10, 100, 110, 400 having a more desirable configuration. For example, if the user determines that the soil 12 and/or foliage 13 are suffering from water deprivation, the user may replace the moisture control grid 10, 100, 110, 400 with a replacement moisture control grid 10, 100, 110, 400 having larger channel portions 22 and/or closer spacing between adjacent strands 16 to increase the water collection and storage capacity of the moisture control grid. Alternately or additionally, the user could install the moisture control grid 10, 100, 110, 400 at a lesser depth 11 below the surface than previously installed. Installing the moisture control grid 10, 100, 110, 400 closer to the surface would tend to increase water absorption of the foliage 13, especially if the soil 12 is composed of a relatively non-porous material, such as clay, which tends to inhibit water percolation and root growth to greater depths. The user may then repeat the aforementioned steps until the user determines the configuration and installation depth 11 of the moisture control grid 10, 100, 110, 400 which result in optimal foliage 13 growth given the unique foliage 13 type, climatic conditions, and soil 12 composition in which the moisture control grid is installed.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "distal," "proximal" and similar terms have been used herein to describe a spatial relationship of one element to another, it is understood that these terms are intended to encompass different orientations of the various elements and components of the device in addition to the orientation depicted in the figures. Moreover, the figures contained in this application are not necessarily drawn to scale.

What is claimed is:

1. A moisture collection apparatus for installation below foliage having roots, comprising:
    a first plurality of strands extending along a first direction;
    a second plurality of strands extending along a second direction and connected to at least one of the first plurality of strands;
    a plurality of channels formed in at least one of the first and second plurality of strands and extending along at least a portion of one of the first direction and the second direction, the channels forming a lower portion, a wall portion, an upper edge of the wall portion, and a flange extending outward from the upper edge of the wall portion to form an outer edge of a strand, and configured to collect and store moisture; and
    a plurality of through openings formed and extending the entire distance between adjacent strands of the first plurality of strands and adjacent strands of the second plurality of strands, the openings configured to allow roots to extend below the apparatus.

2. The moisture collection apparatus of claim 1, wherein the first direction is substantially orthogonal to the second direction.

3. The moisture collection apparatus of claim 1, wherein one of the first and second directions is circumferential such that one of the first and second plurality of strands is generally circular.

4. The moisture collection apparatus of claim 1, wherein one of the first plurality of strands extends beyond a first and last one of the second plurality of strands.

5. The moisture collection apparatus of claim 1, wherein adjacent strands of the first plurality of strands are spaced apart approximately 4 inches, and adjacent strands of the second plurality of strands are spaced apart approximately 4 inches.

6. The moisture collection apparatus of claim 1, wherein the channels are U-shaped and comprise:
an arcuate surface having two upper edges; and
two substantially vertical wall portions extending in a first direction from the two upper edges.

7. The moisture collection apparatus of claim 1, wherein the channels are substantially rectangular.

8. The moisture collection apparatus of claim 1, wherein the flange forms substantially a right angle with at least a portion of the channel.

9. The moisture collection apparatus of claim 1, wherein the moisture collection apparatus comprises polyvinyl chloride.

10. The moisture collection apparatus of claim 1, further comprising an enclosure at the ends of the first plurality of strands and the second plurality of strands.

11. The moisture collection apparatus of claim 1, wherein at least one of the plurality of channels tapers along the first direction or the second direction.

12. The moisture collection apparatus of claim 1, wherein adjacent strands of the first plurality of strands at a first portion of the moisture collection apparatus are spaced apart a first distance greater than a second distance between adjacent strands of the first plurality of strands at a second portion of the moisture collection apparatus.

13. The moisture collection apparatus of claim 1, further comprising a plurality of troughs formed at each of the connections between the first plurality of strands and the second plurality of strands.

14. The moisture collection apparatus of claim 1, wherein the moisture collection apparatus is approximately 24 inches wide by 24 inches high.

15. The moisture collection apparatus of claim 1, wherein the moisture collection apparatus is configured to be wound into a roll.

16. The moisture collection apparatus of claim 1, wherein a ratio between a planform area covered by the strands and a planform area of the through openings is between approximately 0.45 and 0.55.

17. The moisture collection apparatus of claim 1, wherein the channels comprise dimples.

18. The moisture collection apparatus of claim 17, wherein the dimples are generally hemispherical.

19. A method of collecting and storing percolating ground water to promote the growth of foliage having roots, the method comprising:
selecting a moisture collection apparatus with a desired configuration; and
installing the moisture collection apparatus below a predetermined depth of soil,
wherein the moisture collection apparatus comprises:
a first plurality of strands extending along a first direction;
a second plurality of strands extending along a second direction and connected to at least one of the first plurality of strands;
a plurality of channels formed in at least one of the first and second plurality of strands and extending along at least one of the first direction and the second direction, the channels forming a lower portion and a wall portion and configured to collect and store moisture; and
a plurality of through openings formed and extending the entire distance between adjacent strands of the first plurality of strands and adjacent strands of the second plurality of strands, the through openings configured to allow roots to extend below the apparatus.

20. The method of claim 19, wherein the predetermined depth is approximately 6 inches.

21. The method of claim 19, further comprising orienting the moisture collection apparatus.

22. The method of claim 19, further comprising:
monitoring the water retention in the soil or the growth performance of foliage growing above the moisture control grid;
determining if the soil and foliage are suffering from water saturation or water deprivation based upon the information gathered by monitoring the soil and the foliage; and
modifying the moisture control apparatus installation.

23. The method of claim 22, wherein modifying the moisture control apparatus installation comprises relocating the moisture control apparatus to a greater depth below the ground if the soil and foliage are water saturated, or relocating the moisture control apparatus to a lesser depth below the ground if the soil and foliage are water deprived.

24. The method of claim 22, wherein modifying the moisture control apparatus installation comprises:
removing the moisture control apparatus from the ground;
selecting a replacement moisture control apparatus with a configuration different than the configuration of the moisture control apparatus removed from the ground; and
installing the replacement moisture control apparatus in the ground.

* * * * *